Figure 1:
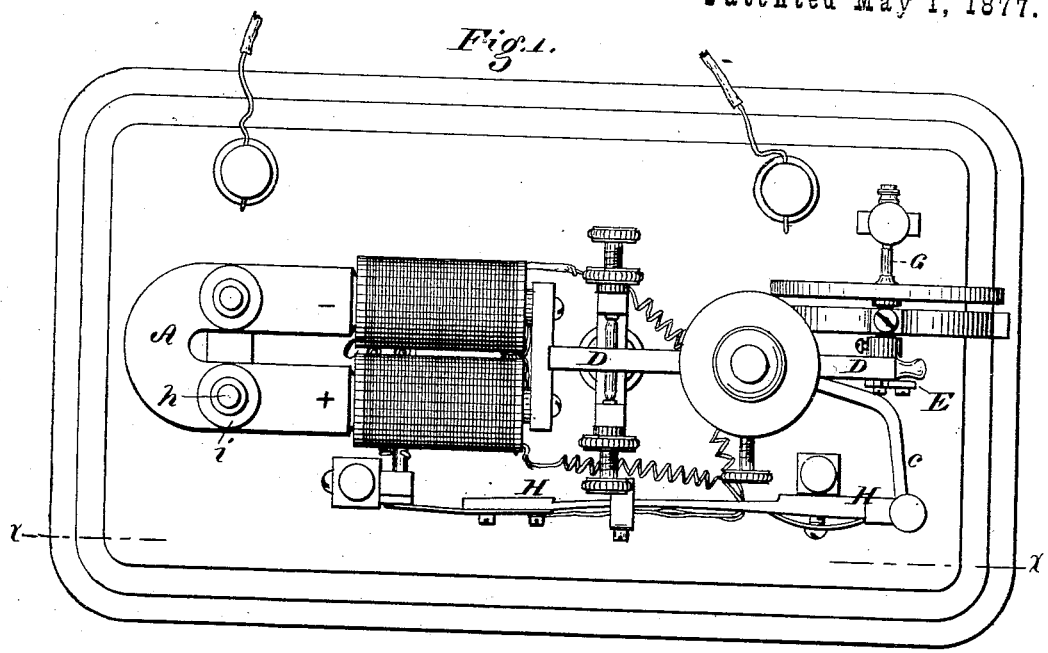

W. W. GARY.
ELECTRO MAGNETIC MOTOR.

No. 190,206. Patented May 1, 1877.

Witnesses:
Donn I. Twitchell
Will H. Dodge

Inventor
W. W. Gary
By his attys
Dodge & Son

UNITED STATES PATENT OFFICE.

WESLEY W. GARY, OF HUNTINGDON, PENNSYLVANIA.

IMPROVEMENT IN ELECTRO-MAGNETIC MOTORS.

Specification forming part of Letters Patent No. 190,206, dated May 1, 1877; application filed October 3, 1876.

*To all whom it may concern:*

Be it known that I, WESLEY W. GARY, of Huntingdon, in the county of Huntingdon and State of Pennsylvania, have invented certain Improvements in Electric Motors, of which the following is a specification:

My invention consists in the use of a reciprocating electro-magnet, the poles of which are changed at each movement, between two permanent magnets arranged with their reverse poles opposite each other; in a peculiar arrangement of devices for reversing the current, and in other details hereinafter described.

The object of my invention is to apply and fully utilize, in an electric motor, the power of permanent magnets, and to develop from them the greater part of the power, so that motors of great power may be actuated by means of small electro-magnets, and a correspondingly small expenditure of battery-power. This end I attain by arranging two permanent magnets at a short distance apart, with the negative pole of each opposite the positive pole of the other, and then arranging between them an electro-magnet attached to the driving mechanism, and connected with an automatic pole-changing device, so that the electro-magnet is attracted and repelled by the two permanent magnets alternately, one attracting it at the same time that it is repelled by the other. In this way I am enabled to employ constantly and directly the full power of the electro-magnet and both permanent magnets, and to produce a motor the greater portion of the power of which is developed by the use of the permanent magnets. As it makes no difference in the power of the motor whether the force to move the vibrating magnet emanates from the permanent or the electro magnet, it is obvious that the same results may be attained by the use of strong permanent magnets in connection with a weak electro-magnet as are attained by the use of weak permanent magnets and a strong electro-magnet, so that on my plan I am enabled to construct motors of large size and power, and operate them with small batteries at a trifling cost. By increasing the power of the permanent magnets the power of the motor may be increased to any extent required without increasing the amount of battery-power required, thus producing a large motor, which may be operated with the same battery-power as a small one. In practice, however, it will be found best to increase the size and power of the electro-magnet and its battery in proportion to the increased power of the permanet magnets; but the most satisfactory and economical results are attained when the strength or power of the permanent magnets exceeds that of the electro-magnet many times.

The form and position of the electro-magnets and the fixed magnets, the construction of the current-changing device, the arrangement of devices for transmitting the power and motion from the vibrating electro-magnet, and the other details may be varied at will, as they form no essential or important part of the invention.

It is preferred to employ horseshoe-magnets, and to arrange them in parallel planes; but they may be made in other forms, and arranged in different relative positions. The permanet magnets may each be made in a single solid piece, or of a series of thin magnets clamped together, the latter being preferred.

Figure 2:
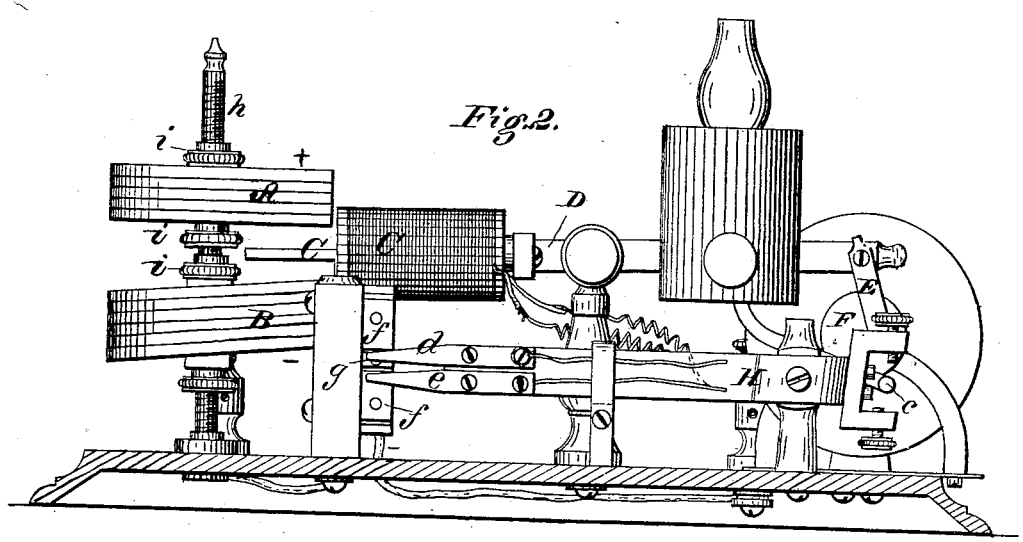
Figure 3:
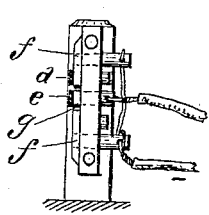

In the accompanying drawings, Figure 1 represents a top-plan view of one form of my motor; Fig. 2, a side elevation of the same; Fig. 3, a detail view, illustrating the construction of the current-changer.

A and B represent two horizontal permanent magnets, arranged one above the other, a small distance apart, with the positive pole of each opposite the negative pole of the other. C represents an electro-magnet, secured to one end of a pivoted vibrating beam, D, which has its opposite end connected by a pitman, E, to a crank-pin on a wheel, F, which is mounted on a main driving-shaft, G, as shown, so that the vibration of the magnet and beam will set the shaft in motion. The ends of the electro-magnet C are flattened and extended between the permanent magnets A and B, and the parts so arranged that it is free to vibrate and carry the end of the beam D up and down.

The magnet C is connected with a battery of any suitable kind; but between the magnet and the battery there is interposed a current-changer, H, which reverses the current of electricity and changes the polarity of the magnet at the end of each vibration or movement, in consequence of which the magnet C is alternately repelled by the magnet A and attracted by the magnet B, and then attracted by A and repelled by B, so that it is kept constantly moving up and down between them. The vibration of the electro-magnet operates the beam D, which, in turn, through the pitman and crank, operates the shaft on which the wheel is mounted.

The current-changer consists of a pivoted vibrating arm, H, having one end forked and operated by a tappet, c, attached to the beam D, and the other end provided with two spring conducting-fingers, d and e, which are connected with opposite ends of the helix, and arranged to play over three metal plates, f, f, and g, the two former connected with the negative and the latter with the positive pole of the battery. The fingers always connect with the opposite poles of the battery, and each finger alternates from the positive to a negative plate, in such manner that the current of electricity has its course through the helix of the electro-magnet reversed at each movement of the fingers.

In order that the permanent magnets may be adjusted in case of necessity, and that, when they are composed of a series of thin plates or magnets, plates may be added to or removed from the series in order to vary the strength of the magnets, they are mounted on vertical screws h, and secured by the nuts i, in the manner shown.

In practice I find that, in order to prevent the permanent magnets from affecting and partially neutralizing each other, the faces or poles of the electro-magnet should be made as wide or wider than those of the permanent magnets.

It is also important that the poles of the electro-magnet shall be flattened on the sides, in order that the entire faces may approach close to the faces or poles of the fixed magnets, which should be flattened in like manner.

I am aware that motors consisting of an outside circular series of permanent magnets and a central rotating series of electro-magnets, the polarity of which is changed as they pass the others, is old; but my arrangement differs therefrom, and is superior thereto, in this, that I apply the power to move the magnet directly in the line or path of movement, while in the rotary machines the power is applied at a tangent, and consequently at a great disadvantage.

I am aware that it is old to arrange a vibrating armature between two electro-magnets which were either polarized alternately, or else their polarity reversed at each movement of the armature; but they differ from my engine, in that they derive their power wholly from the electro-magnets, while in my engine the power is derived mainly from the permanent magnets, and also in that they require the use of two electro-magnets, while in my engine one only is used.

My combination possesses the advantages of requiring but little battery-power in proportion to the amount of power developed by the engine, and of permitting the vibrating parts to be made light, so that the engine may be operated with rapidity.

It is obvious that, instead of having a single electro-magnet and one pair of permanent magnets at one end of the beam, there may be a similar combination used at each end, or two or more combinations used at either end. It is also obvious that, instead of using the electro-magnet of the horseshoe form, a straight one may be arranged transversely between the two permanent magnets.

Having thus described my invention, what I claim is—

1. The combination, in an electric motor, of two permanent magnets, A B, and an electro-magnet, C, connected with a pole-changing device, and arranged to vibrate between the permanent magnets, substantially as described and shown.

2. The combination of two permanent magnets, arranged with their reverse poles opposite to, but separated from, each other, and a reciprocating electro-magnet connected with an automatic pole-changing device, substantially as shown and described.

3. The combination, in an electric motor, of a reciprocating electro-magnet, connected with an automatic pole-changing device, and two compound permanent magnets, arranged on opposite sides of the electro-magnet, each consisting of a series of thin magnets, united in such manner that the series may be increased or diminished in number, at will, for the purpose of increasing or diminishing the power of the motor.

4. In combination with the magnets A B and the vibrating electro-magnet C, the beam D, provided with the tappet c, and the arm H, provided with the fingers d and e, moving upon the plates f f g, as shown.

WESLEY W. GARY.

Witnesses:
P. T. DODGE,
W. C. DODGE.